(12) United States Patent
Ishiwata

(10) Patent No.: US 10,114,207 B2
(45) Date of Patent: Oct. 30, 2018

(54) APPARATUS AND METHOD FOR OBTAINING THREE-DIMENSIONAL INFORMATION

(71) Applicant: OLYMPUS CORPORATION, Hachioji-shi, Tokyo (JP)

(72) Inventor: Hiroshi Ishiwata, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 381 days.

(21) Appl. No.: 15/149,855

(22) Filed: May 9, 2016

(65) Prior Publication Data

US 2016/0334613 A1 Nov. 17, 2016

(30) Foreign Application Priority Data

May 13, 2015 (JP) .................................. 2015-098360

(51) Int. Cl.
*G02B 21/36* (2006.01)
*G02B 21/00* (2006.01)
*G02B 21/22* (2006.01)

(52) U.S. Cl.
CPC ....... *G02B 21/361* (2013.01); *G02B 21/0024* (2013.01); *G02B 21/0032* (2013.01); *G02B 21/22* (2013.01); *G02B 21/367* (2013.01)

(58) Field of Classification Search
None
See application file for complete search history.

(56) References Cited

U.S. PATENT DOCUMENTS 9,772,481 B2 * 9/2017 Knebel .............. G02B 21/0032
2002/0001406 A1 1/2002 Kochi et al.
(Continued)

FOREIGN PATENT DOCUMENTS

JP 2000258139 A 9/2000
JP 2001280956 A 10/2001
(Continued)

OTHER PUBLICATIONS

Marc Levoy, et al., "Light Field Microscopy", ACM Transactions on Graphics 25(3), Proc. SIGGRAPH 2006, 11 Pages.

*Primary Examiner* — William C Vaughn, Jr.
*Assistant Examiner* — Lindsay Uhl
(74) *Attorney, Agent, or Firm* — Holtz, Holtz & Volek PC

(57) ABSTRACT

A three-dimensional information obtaining apparatus includes an illumination optical system that illuminates a sample with a light sheet, an imaging device that has a two-dimensional imaging element and that captures an image of the sample illuminated by the illumination optical system, an observation optical system that forms, on the two-dimensional imaging element, a plurality of optical images of the sample observed from a plurality of different directions, and an arithmetic device that calculates three-dimensional information of the sample from a plurality of pieces of image data of the sample. A thickness D of the light sheet satisfies $D \leq 8 \cdot PP/\beta/NA$ when $PP > \lambda \cdot \beta/(4 \cdot NA)$ is satisfied, where PP is a pixel pitch of the two-dimensional imaging element, $\lambda$ is a wavelength of observation light, $\beta$ is a magnification of the plurality of optical images, and NA is a numerical aperture on an object side of the observation optical system.

12 Claims, 14 Drawing Sheets

(56) References Cited

U.S. PATENT DOCUMENTS

| | | |
|---|---|---|
| 2006/0013474 A1 | 1/2006 | Kochi et al. |
| 2006/0033987 A1 | 2/2006 | Stelzer et al. |
| 2007/0109633 A1 | 5/2007 | Stelzer |
| 2009/0225413 A1 | 9/2009 | Stelzer et al. |
| 2011/0122488 A1* | 5/2011 | Truong .............. G01N 21/6408 359/385 |
| 2012/0026295 A1 | 2/2012 | Nishimura et al. |
| 2012/0057013 A1 | 3/2012 | Ishiwata |
| 2013/0278813 A1 | 10/2013 | Ogasahara et al. |
| 2014/0042339 A1 | 2/2014 | Stelzer et al. |
| 2014/0063234 A1 | 3/2014 | Nobayashi |
| 2015/0071498 A1 | 3/2015 | Nishimura et al. |
| 2015/0177506 A1 | 6/2015 | Nishiwaki |
| 2015/0309294 A1 | 10/2015 | Stelzer |
| 2016/0327779 A1* | 11/2016 | Hillman ............... G02B 21/367 |

FOREIGN PATENT DOCUMENTS

| | | |
|---|---|---|
| JP | 2006509246 A | 3/2006 |
| JP | 2012073591 A | 4/2012 |
| JP | 2013222133 A | 10/2013 |
| JP | 2013235110 A | 11/2013 |
| JP | 2013239170 A | 11/2013 |
| JP | 2014048459 A | 3/2014 |
| JP | 2015135463 A | 7/2015 |
| WO | 2004053558 A1 | 6/2004 |

\* cited by examiner

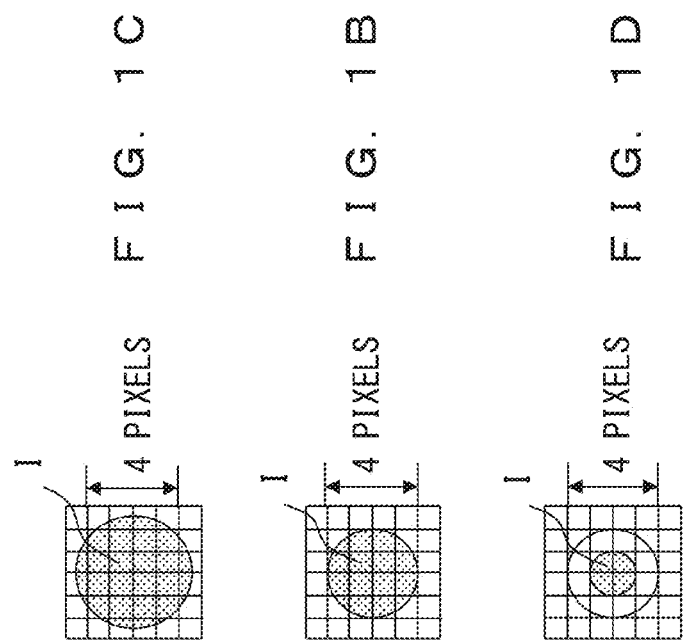
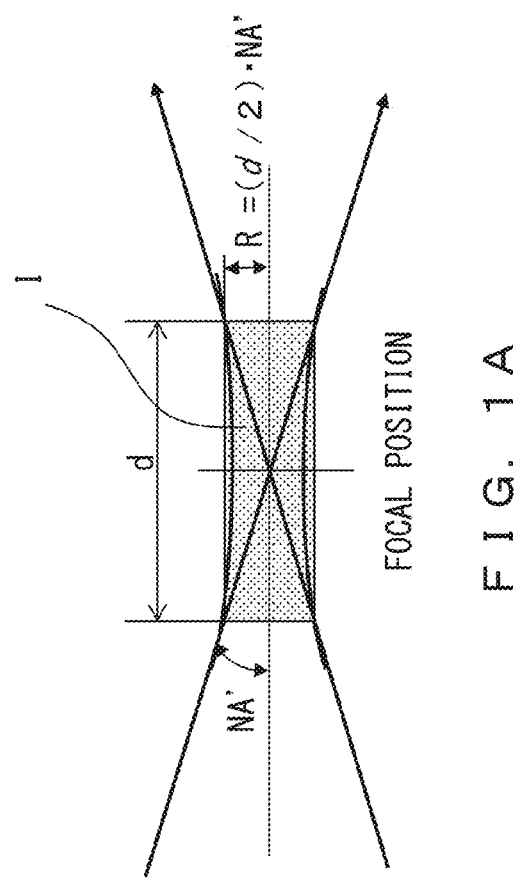

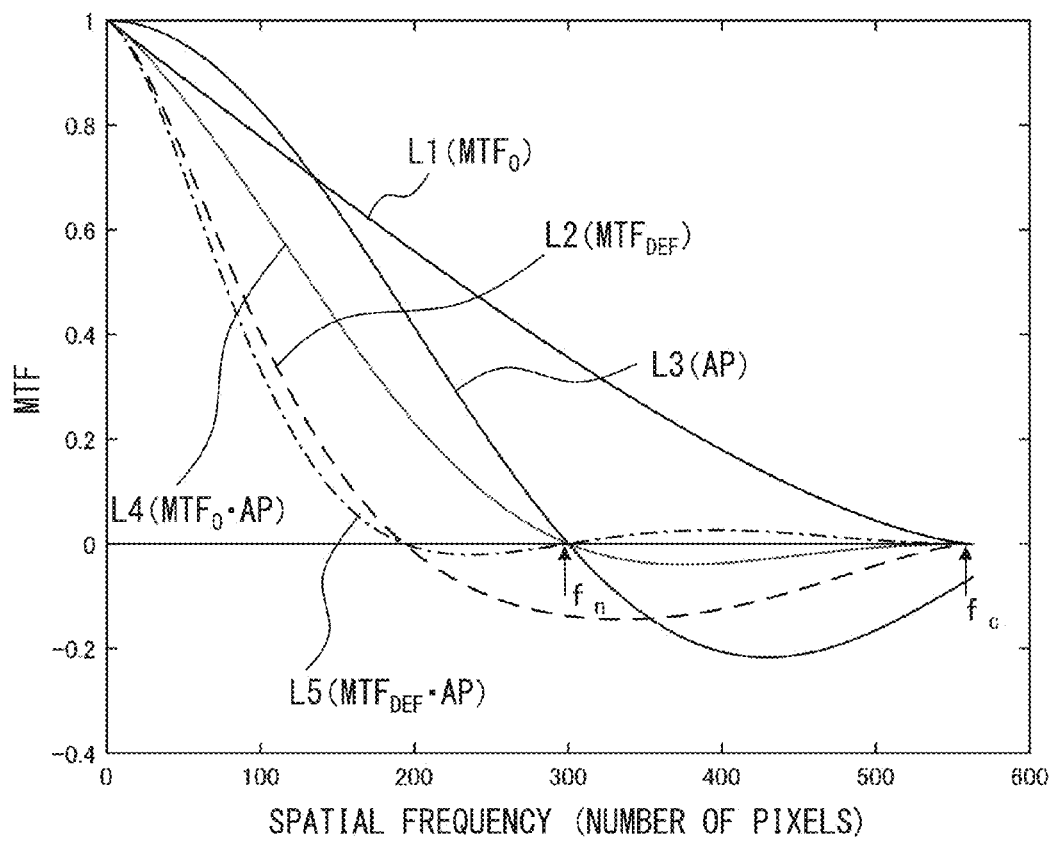
F I G. 4

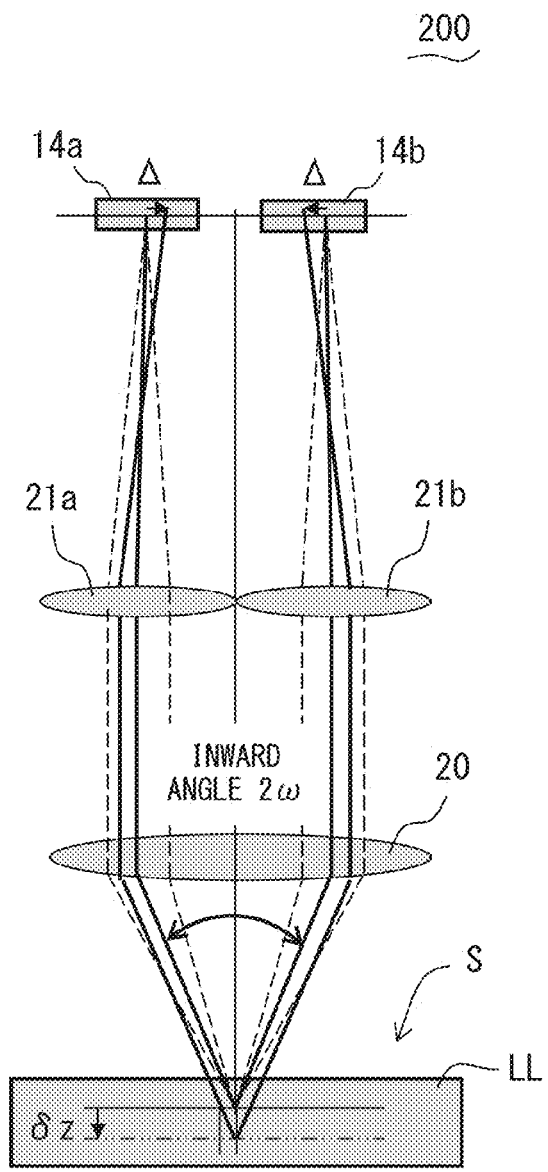
F I G. 9

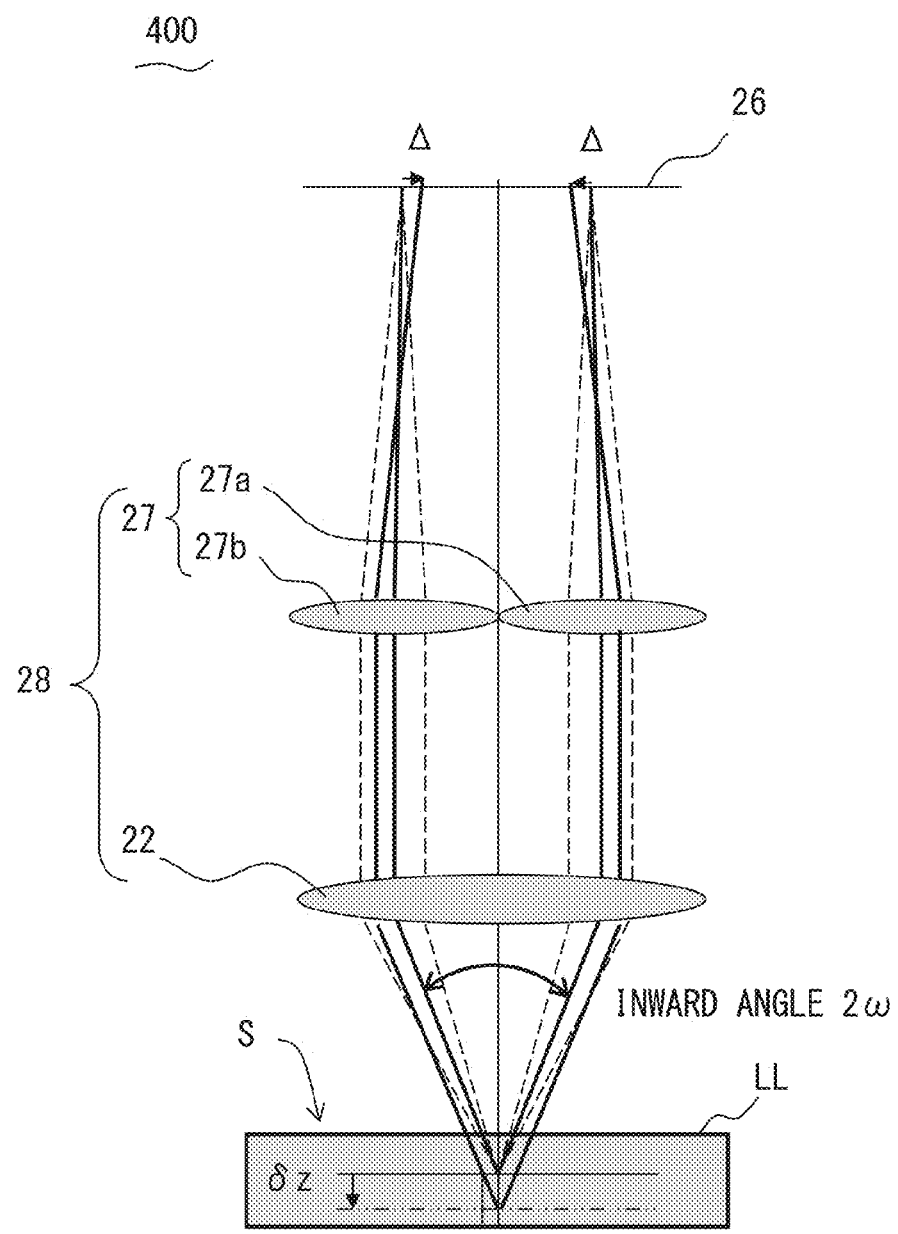
F I G. 13

APPARATUS AND METHOD FOR OBTAINING THREE-DIMENSIONAL INFORMATION

CROSS REFERENCE TO RELATED APPLICATIONS

This application is based upon and claims the benefit of priority from prior Japanese Patent Application No. 2015-098360, filed May 13, 2015, the entire contents of which are incorporated herein by this reference.

BACKGROUND OF THE INVENTION

Field of the Invention

The present invention relates to a technology of an apparatus and a method for obtaining three-dimensional information.

Description of the Related Art

In the field of fluorescence microscopy, a confocal microscope is well known as means for generating three-dimensional information of a sample. In recent years, a microscope is also known that uses a light sheet illumination that irradiates a sample with sheet-shaped light (hereinafter referred to as a light sheet) from a direction perpendicular to a direction of an optical axis of a detection optical system (hereinafter referred to as a light sheet microscope) (see Japanese National Publication (Translated PCT Application) No. 2006-509246). This technology has been attracting attention because it provides the advantages of, for example, suppressing damage caused to a sample and realizing a high resolving power in the direction of the optical axis (a z-axis) of the detection optical system.

SUMMARY OF THE INVENTION

An aspect of the present invention provides a three-dimensional information obtaining apparatus including an illumination optical system that illuminates a sample with a light sheet, an imaging device that has a two-dimensional imaging element and that captures an image of the sample illuminated by the illumination optical system, an observation optical system that forms, on the two-dimensional imaging element, a plurality of optical images of the sample observed from a plurality of different directions, and an arithmetic device that calculates three-dimensional information of the sample from a plurality of pieces of image data of the sample that are generated by the imaging device, wherein a thickness D of the light sheet satisfies the following conditional expression when $PP > \lambda \cdot \beta / (4 \cdot NA)$ is satisfied, where PP is a pixel pitch of the two-dimensional imaging element, $\lambda$ is a wavelength of observation light from the sample, $\beta$ is a magnification of the plurality of optical images that are formed by the observation optical system on the imaging element, and NA is a numerical aperture on an object side of the observation optical system:

$D \leq 8 \cdot PP/\beta/NA$.

Another aspect of the present invention provides a method for obtaining three-dimensional information, the method including illuminating a sample with a light sheet, forming, on a two-dimensional imaging element, a plurality of optical images of the sample illuminated by the light sheet, the plurality of optical images being optical images obtained by observing the sample from directions different from one another, generating a plurality of pieces of image data of the sample using the imaging device that includes the two-dimensional imaging element on which the plurality of optical images are formed, and calculating three-dimensional information of the sample from the plurality of pieces of image data, wherein a thickness D of the light sheet satisfies the following conditional expression when $PP > \lambda \cdot \beta / (4 \cdot NA)$ is satisfied, where PP is a pixel pitch of the two-dimensional imaging element, $\lambda$ is a wavelength of observation light from the sample, $\beta$ is a magnification of the plurality of optical images that are formed on the two-dimensional imaging element, and NA is a numerical aperture on an object side of the observation optical system:

$D \leq 8 \cdot PP/\beta/NA$.

BRIEF DESCRIPTION OF THE DRAWINGS

The present invention will be more apparent from the following detailed description when the accompanying drawings are referenced.

FIGS. 1A to 1D are diagrams for explaining a focal depth;

FIG. 4 illustrates a frequency response characteristic when the amount of defocus is equivalent to twice the pixel focal depth;

FIG. 9 illustrates a configuration of a modified three-dimensional information obtaining apparatus 200;

FIG. 13 illustrates a configuration of a three-dimensional information obtaining apparatus 400 according to a third embodiment.

DESCRIPTION OF THE EMBODIMENTS

Figure 2:
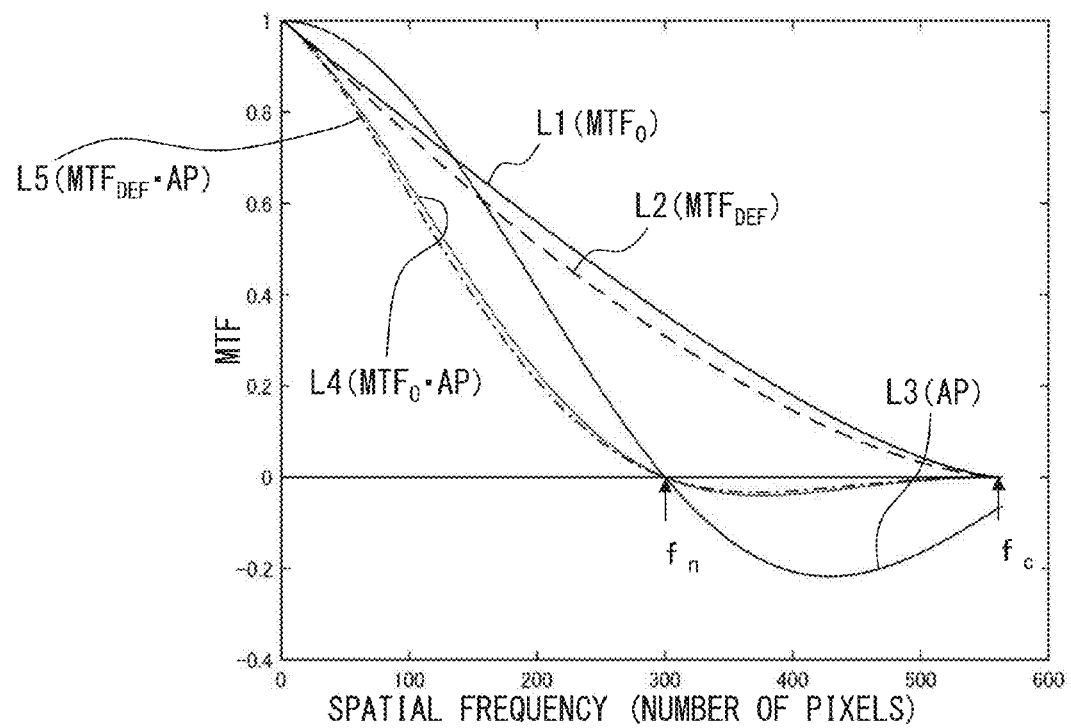
FIG. 2 illustrates a frequency response characteristic when an amount of defocus is equivalent to an optical focal depth.

In conventional light sheet microscopes, a shorter z-resolution ("z-resolution is short" means that a distance between two resolvable points by the z-resolution is short. that is, a short z-resolution is a higher resolving power in a z-axis direction) can be realized if a numerical aperture of an illumination optical system is made higher and a thickness of a light sheet (a thickness in the z-axis direction) is made thinner. This permits obtaining of highly accurate three-dimensional information. However, when three-dimensional information of a sample is obtained, the number of required z-stack images increases if a light sheet is thinner. Further, if the numerical aperture is higher, an illumination area in which a light sheet has a predetermined thickness in a direction perpendicular to an optical axis of a detection optical system is smaller. As a result, it takes time to generate three-dimensional information of the sample.

Three-dimensional information obtaining apparatuses according to embodiments described later are all light sheet microscopy apparatuses that use a light sheet illumination. These three-dimensional information obtaining apparatuses illuminate a sample by a light sheet that has, in a z-axis direction, a thickness greater than the conventional cases, capture images of the sample from different directions, and calculate three-dimensional information on the sample from a plurality of pieces of image data obtained as a result of the image-capturing. This results in obtaining highly accurate three-dimensional information rapidly. The light sheet microscopy apparatus according to each of the embodiments is suitable for use in fluorescent observation, and its application to fluorescent observation permits detecting of fluorescence that occurs from a biological sample so as to obtain an internal structure of the biological sample as three-dimensional information. A direction of a thickness of a light sheet, that is, a direction perpendicular to a light-receiving surface of an imaging element is hereinafter referred to as a z-axis direction. A direction perpendicular to the z-axis direction is hereinafter referred to as an xy-axis direction. Further, the thickness of a light sheet may be defined by a thickness of an area in which an intensity is not less than $1/e^2$ of a peak intensity in a beam.

Before each of the embodiments is described specifically, a method for determining a thickness of a light sheet to be irradiated onto a sample and a method for calculating three-dimensional information of the sample from pieces of image data of the sample will be described.

<Thickness of Light Sheet>

Three-dimensional information of an area, in a sample, which is irradiated with a light sheet can be calculated by a method described later. Using the method, three-dimensional information of the entirety of the sample can be obtained more rapidly if the light sheet is made thicker so as to illuminate within a wider range at one time. However, when the light sheet is too thick, an optical image of the sample is blurred, which results in reducing an image contrast. This may result in degrading the accuracy of three-dimensional information calculated by the method described later. Thus, preferably, a thickness of a light sheet is set so that the light sheet is thick within a range in which a degradation of the accuracy of three-dimensional information does not occur.

A focal depth is known as criteria to determine whether the effect of the blurring is acceptable. FIGS. 1A to 1D are diagrams for explaining a focal depth. d is a focal depth, and NA' is a numerical aperture on an image side of an observation optical system. An area I depicted by shading indicates an expansion of the point spread function. FIG. 1A illustrates that the point spread function has a substantially constant expansion within the focal depth. As illustrated in FIG. 1A, when the radius of the point spread function is R, the following formula is derived from a geometric relationship:

$$R = (d/2) \cdot NA' \quad (1)$$

When a resolution ($\lambda/(2 \cdot NA')$) of the observation optical system is substituted for R, the focal depth is represented by the following formula. This formula is a most commonly known formula of a focal depth. Here, $\lambda$ is a detection wavelength.

$$d = \lambda/NA'^2 \quad (2)$$

When image-capturing is performed by an imaging device, the resolution depends not only on an observation optical system but also on an imaging element included in the imaging device. The resolution of the imaging element is an inverse of the Nyquist frequency, and is defined as the size of two pixels. Thus, in the imaging device, two points are resolved by data of which one unit is 4×4 pixels and which is obtained by sampling. As illustrated in FIG. 1B, in a state in which the radius R of the point spread function is consistent with the size of two pixels (R=2·PP), the resolution of the observation optical system is consistent with the resolution of the imaging element. Here, PP is the size of one pixel.

When the resolution of the observation optical system is equal to or longer than the resolution of the imaging element (that is, when $\lambda/(2 \cdot NA') \geq 2 \cdot PP$), the point spread function expands beyond an area of 4×4 pixels, as illustrated in FIG. 1C. Thus, the resolution of the overall device is limited by the resolution of the observation optical system. Thus, the focal depth is represented by Formula (2).

On the other hand, when the resolution of the observation optical system is shorter than the resolution of the imaging element (that is, when $\lambda/(2 \cdot NA') < 2 \cdot PP$), the point spread function is within the area of 4×4 pixels, as illustrated in FIG. 1D. Thus, the resolution of the overall device is limited by the resolution of the imaging element. In this case, there does not occur any change in image contrast until the point spread function expands beyond the area of 4×4 pixels due to defocus. The focal depth is obtained by substituting the resolution of the imaging element for R of Formula 1, and is represented by Formula (3). Formula (3) indicates that the focal depth d is defined as a width of a range forward and rearward of a focal plane in which the point spread function formed on a light-receiving surface of the imaging element is within the area of 4×4 pixels.

$$d = 4 \cdot PP/NA' \quad (3)$$

Under the condition in which the resolution of the observation optical system is shorter than the resolution of the imaging element, the focal depth represented by Formula (3) is greater than the focal depth represented by Formula (2). This state is more likely to occur when the magnification of the observation optical system is low and the numerical aperture NA' on the image side is high. Thus, when the observation magnification is low, not the focal depth represented by Formula (2) that is commonly known but the focal depth represented by Formula (3) is appropriate for the focal depth of the device. The focal depth of Formula (2) is hereinafter referred to as an optical focal depth, and the focal depth of Formula (3) as a pixel focal depth.

When an image of an area illuminated by a light sheet is projected within the focal depth, the effect of the blurring can be disregarded. Thus, when Formula (4) is satisfied on the condition that $PP \leq \lambda/4NA'$ and when Formula (5) is satisfied on the condition that $PP > \lambda/4NA'$, three-dimensional information can be calculated while disregarding the effect of the blurring. Here, D is a thickness of a light sheet. NA is a numerical aperture on an object side of the observation optical system. $\beta$ is a magnification of the observation optical system.

$$D \leq \lambda/NA^2 \quad (4)$$

$$D \leq 4 \cdot PP/\beta/NA \quad (5)$$

Formulas (4) and (5) are derived from Formulas (2) and (3) by considering that a light sheet is projected onto an image surface in a state in which it is $\beta^2$ times as thick as its original thickness and that there is a relationship of $NA'=NA/\beta$ between NA' and NA.

If three-dimensional information is calculated by the method described later, there is a possibility that three-dimensional information can be calculated with a high accuracy even when an image of an area illuminated by a light sheet is not within a focal depth. This will be described below.

Figure 3:
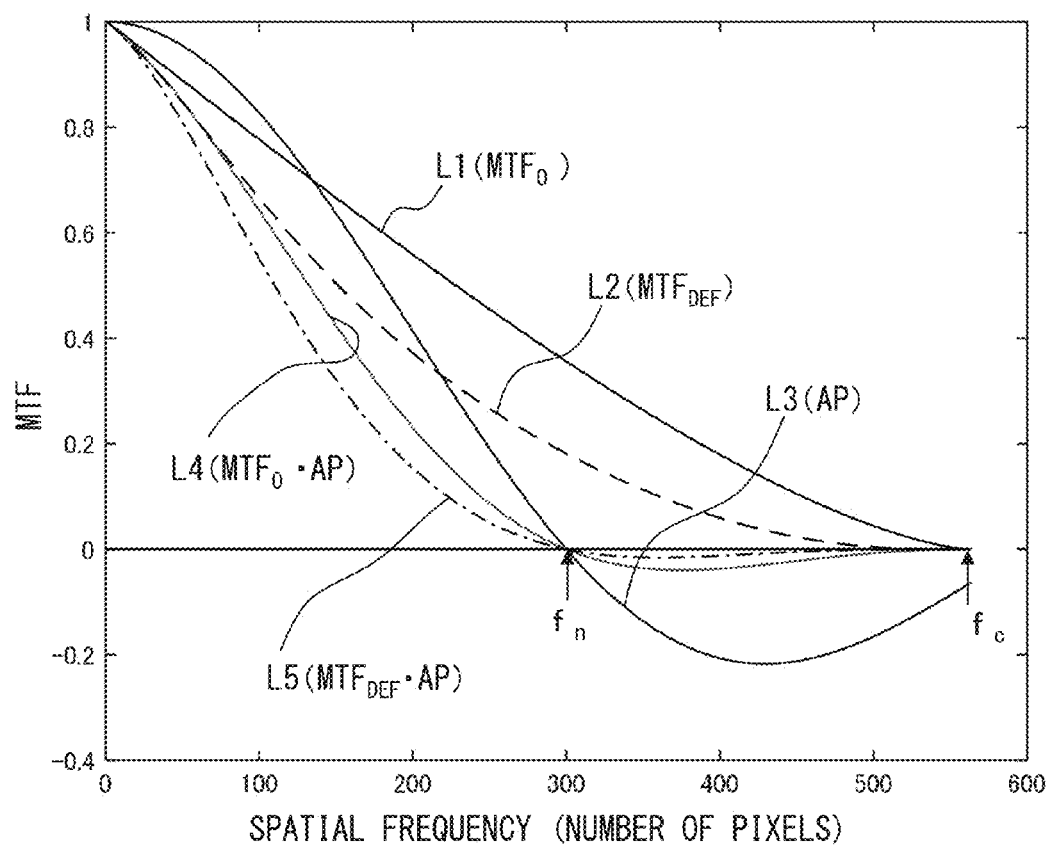
FIG. 3 illustrates a frequency response characteristic when the amount of defocus is equivalent to a pixel focal depth.

FIG. 2 illustrates a frequency response characteristic when an amount of defocus is equivalent to an optical focal depth. FIG. 3 illustrates a frequency response characteristic when the amount of defocus is equivalent to a pixel focal depth. FIG. 4 illustrates a frequency response characteristic when the amount of defocus is equivalent to twice the pixel focal depth. Here, L1 indicates an MTF of an observation optical system without aberrations (hereinafter simply referred to as $MTF_0$). L2 indicates an MTF of the observation optical system when defocusing (hereinafter referred to as $MTF_{DEF}$). L3 indicates an aperture function AP that is limited by a pixel size of an imaging element. L4 indicates a product of the aperture function AP and $MTF_0$. L5 is a product of AP and $MTF_{DEF}$. L4 and L5 are the frequency response characteristics of a device including the observation optical system and the imaging element, respectively. Image data captured by the imaging element may include a frequency component that has positive values in L4 and L5. All of the characteristics illustrated in FIGS. 2 to 4 are calculated on the following conditions:

PP=6.45 μm, $\beta$=2, NA=0.08, and $\lambda$=0.55 μm

All of the methods for calculating three-dimensional information described later are types of correlation measurement method. When a movement of an image is detected by a correlation measurement method so as to calculate three-dimensional information, preferably, there is no decrease in image contrast. However, in the correlation measurement method, a movement of an image is detected by performing comparison of spatial frequency distribution of an object, so it is possible to calculate three-dimensional information with a high accuracy even if an image contrast is low. However, when there exists a spatial frequency distribution of an object in a high-frequency range because, for example, the object is small, the spatial frequency distribution existing in a high-frequency range is not sufficiently transmitted if an MTF is excessively degraded due to defocus. As a result, it becomes difficult to detect a movement of an image. Thus, normally, it is preferable that $MTF_{DEF}$ indicated by L2 has a positive value at the Nyquist frequency $f_n$ such that the frequency response characteristic $MTF_{DEF} \cdot AP$ has a positive value up to the Nyquist frequency $f_n$. $f_c$ illustrated in FIGS. 2 to 4 is a cutoff frequency of the observation optical system.

However, in the imaging element, noise may occur at random for each pixel. In order to reduce the effect of the noise which occurs at random, in the imaging device, for example, averaging processing of 2×2 pixels is performed when an image is generated. When the comparison of spatial frequency distribution is performed by correlation measurement, there is a possibility that an image signal of the Nyquist frequency will be affected by the noise which occurs for each pixel or by information that is lost due to averaging processing.

Therefore, in order to avoid these effects, preferably, a spatial frequency component used for comparison is lower than the Nyquist frequency, and spatial frequency components up to a spatial frequency component closest to the Nyquist frequency are used for correlation measurement. A spatial frequency component of an image has a discrete spatial frequency represented by 1/(an even multiple of a pixel size PP). Thus, spatial frequencies up to a spatial frequency of ½ of the Nyquist frequency (1/(4·PP)) are preferably used for correlation measurement. In this case, even if a frequency response characteristic is degraded due to defocus, it is possible to perform correlation measurement as long as the frequency response characteristic ($MTF_{DEF} \cdot AP$) has a positive value up to the spatial frequency of ½ of the Nyquist frequency (1/(4·PP)). Further, just to be on the safe side, more preferably, the frequency response characteristic ($MTF_{DEF} \cdot AP$) has a positive value up to a spatial frequency of 1/(3·PP)).

The amount of defocus in which the frequency response characteristic ($MTF_{DEF} \cdot AP$) has a positive value up to the spatial frequency of ½ of the Nyquist frequency is considered to be equivalent to twice the focal depth. In other words, the amount of defocus is considered to be a range in which the point spread function that expands due to defocus is within an area of 8×8 pixels. This can also be confirmed from FIG. 4. FIG. 4 illustrates a frequency response characteristic when the amount of defocus equivalent to twice the pixel focal depth (8·PP/$\beta$/NA) is given, wherein the frequency response characteristic ($MTF_{DEF} \cdot AP$) also has a positive value at the spatial frequency of ½ of the Nyquist frequency.

As described above, three-dimensional information can be calculated with a high accuracy even when defocusing is performed up to the equivalent of twice the focal depth. This permits a light sheet to be expanded up to a range in which the amount of defocus is equivalent to twice the focal depth. Thus, in order to calculate three-dimensional information with a high accuracy, the three-dimensional information obtaining apparatus according to each of the embodiments described later may be configured to satisfy Formula (6) on the condition that $PP \leq \lambda \cdot \beta/(4 \cdot NA)$. Further, it may be configured to satisfy Formula (7) on the condition that $PP > \lambda \cdot \beta/(4 \cdot NA)$.

$$D \leq 2 \cdot \lambda/NA^2 \quad (6)$$

$$D \leq 8 \cdot PP/\beta/NA \quad (7)$$

In order to obtain three-dimensional information rapidly, a thicker light sheet has an advantage. Thus, in order to obtain highly accurate three-dimensional information rapidly, for example, the three-dimensional information obtaining apparatus is preferably configured to satisfy Formula (8) on the condition that $P \leq \lambda \cdot \beta/(4 \cdot NA)$. Further, it is preferably configured to satisfy Formula (9) or Formula (9)' on the condition that $PP > \lambda \cdot \beta/(4 \cdot NA)$.

$$\lambda/NA^2 \leq D \leq 2 \cdot \lambda/NA^2 \quad (8)$$

$$4 \cdot PP/\beta/NA \leq D \leq 8 \cdot PP/\beta/NA \quad (9)$$

$$\lambda/NA^2 \leq D \leq 8 \cdot PP/\beta/NA \quad (9)'$$

<Calculation of Three-Dimensional Information>

Next, a method for calculating three-dimensional information of a sample from pieces of image data of the sample is described.

When a projection position of an object point in a sample is within the focal depth, the image intensity corresponding to the object point does not change or the gray level value of a pixel does not change even if a front focal position is moved in the z-axis direction. Thus, it is difficult to obtain, from the change in the gray level value corresponding to an identical object point, three-dimensional information, especially depth information (information in the z-axis direction), with an accuracy higher than the accuracy of equivalent to the focal depth. Therefore, in the three-dimensional information obtaining apparatuses according to the embodiments described later, images of the sample are captured from a plurality of different directions and an amount of movement of an image is calculated, using a correlation measurement method, from a plurality of pieces of image data of the sample that are obtained as a result of the image-capturing. Then, three-dimensional information of the sample is calculated on the basis of the calculated amount of movement.

Figure 5C:
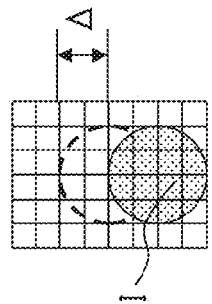
FIGS. 5A to 5D are diagrams for explaining a change due to defocus in the position in which the point spread function is formed.
Figure 5B:
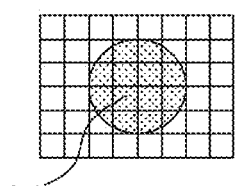
Figure 5D:
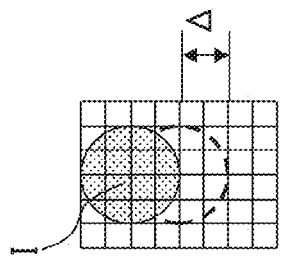
Figure 5A:
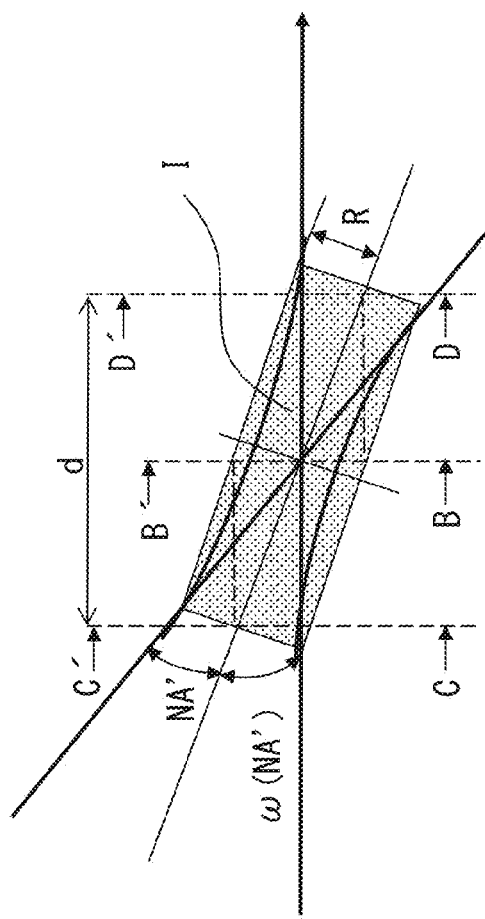

First, a method for detecting a movement of an image is outlined. FIGS. 5A to 5D are diagrams for explaining a change due to defocus in the position in which the point spread function is formed. FIG. 5A illustrates an example in which a beam with a numerical aperture NA' enters the imaging element at an angle ω. FIGS. 5B, 5C, and 5D illustrate the point spread functions formed in the imaging element when an identical object point in a sample is projected, by performing defocusing, onto a section BB', a section CC', and a section DD' of FIG. 5A, respectively.

When the front focal position is moved in the z-axis direction by performing defocusing, the point spread function is moved laterally (in the xy-axis direction) on the imaging element. In other words, an identical object point is projected onto the imaging element in different positions according to an amount of shift from the front focal position. FIGS. 5C and 5D each illustrate a state in which the point spread function has laterally moved by two pixels using FIG. 5B as a base. They also illustrate that the direction in which the point spread function moves differs depending on the direction of defocus. Further, according to a calculation method described later, it is also possible to detect an amount of movement of the point spread function that is less than one pixel.

Next, a method for obtaining three-dimensional information on the basis of the amount of movement of an image. The method for calculating the amount of movement of an image will be described later. A beam having an angle ω illustrated in FIG. 5A enters the imaging element by limiting an area, on a pupil plane of the observation optical system, through which a beam is transmitted. In this state, an image of a sample is captured and first image data is generated. Next, the area on the pupil plane through which a beam is transmitted is moved to a position rotationally symmetric with respect to an optical axis. This permits a beam to enter the imaging element from a direction symmetric with respect to the optical axis (z axis) while maintaining the incident angle of the beam that enters the imaging element. In this state, an image of the sample is captured again and second image data is generated. The first image data and the second image data are pieces of data of a sample image formed at an identical detection wavelength. The image displayed on the basis of the first image data is hereinafter referred to as a first image, and the image displayed on the basis of the second image data as a second image.

In the first image and the second image, images of an identical object point in the sample are projected onto positions in which the image has moved laterally (in the xy direction) by ±Δ, respectively, from a reference value according to an amount of shift δz from the front focal position. Using this, differential image data of the sample having an image intensity that is dependent on the amount of movement Δ of an image is calculated from the first image data and the second image data. The image data obtained as a result of a difference operation is hereinafter referred to as difference-operation image data.

Finally, three-dimensional information is obtained from the difference-operation image data. For example, a portion in which an image intensity is zero is a portion in which the amount of movement Δ of an image is zero, and δz=0, that is, the portion is located in the focal position. Thus, a portion located in the focal position in the sample can be identified by extracting a portion in which a pixel value (a gray level value) of the difference-operation image data is a near zero value. Accordingly, three-dimensional information located in the focal position is identified from among pieces of three-dimensional information of the sample. Further, pieces of three-dimensional information of other portions in the sample can also be identified by changing the relative positional relationship between the sample and the observation optical system and by generating difference-operation image data. The portion located in the focal position in the sample may be identified by extracting a portion in which, instead of the pixel value of the difference-operation image data itself, a pixel value of image data having an absolute value of the difference-operation image data or a pixel value of image data obtained by performing filtering processing on the difference-operation image data using Sobel filters is a near zero value. There is a predetermined relationship between the amount of movement Δ and the amount of shift δz from the focal position. Thus, three-dimensional information of a portion other than the portion in which the amount of movement Δ is zero can also be identified by identifying the amount of shift δz from the focal position on the basis of the amount of movement Δ.

Figure 6:
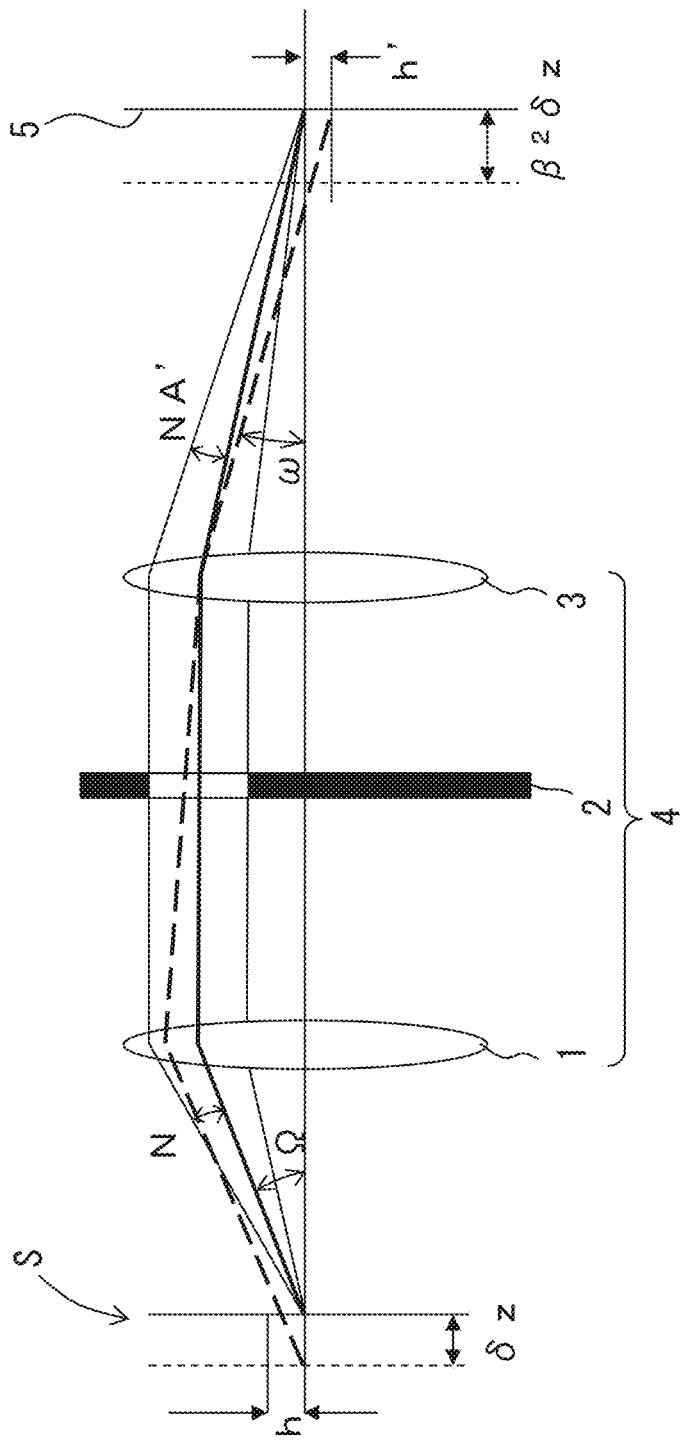
FIG. 6 is a diagram for explaining a relationship between an amount of movement $\Delta$ and an amount of shift $\delta z$ from a focal position.

FIG. 6 is a diagram for explaining a relationship between the amount of movement Δ and the amount of shift δz from the focal position. FIG. 6 illustrates an observation optical system 4 constituted of an objective 1, a pupil area limiting element 2 arranged on its pupil plane, and a tube lens 3. As illustrated in FIG. 6, by using the pupil area limiting element 2, an area through which a beam is transmitted is limited on the pupil plane of the observation optical system 4. An example in which, as a result of the limitation, a beam with a numerical aperture NA enters the observation optical system 4 from a sample S at an angle Ω and a beam with a numerical aperture NA' enters a light-receiving surface 5 of an imaging element at an angle ω from the observation optical system 4 will be discussed.

As illustrated in FIG. 6, a change by δz in a relative positional relationship between the sample S and the observation optical system 4 is equivalent to a movement of an object point by h in a direction perpendicular to an optical axis. The amount of movement h of the object point is represented by Formula (10).

$$h = \delta z \cdot \tan \Omega \qquad (10)$$

When δz has a value similar to the focal depth, light from the object point is collected in a position away from the optical axis on the light-receiving surface 5 of the imaging element by h' represented in Formula (11), wherein a magnification of the observation optical system 4 is β.

$$\begin{aligned} h' &= \beta \cdot h \\ &= \beta \cdot \delta z \cdot \tan \Omega \end{aligned} \qquad (11)$$

From the relationship of h'=Δ, the amount of movement Δ of an image is represented by Formula (12).

$$\Delta = \beta \cdot \delta z \cdot \tan \Omega \quad (12)$$

Thus, δz is calculated on the basis of Formula (12) by calculating the amount of movement Δ of an image on the light-receiving surface 5 of the imaging element. Accordingly, three-dimensional information (x, y, δz) of the object point in the sample S can be identified.

Next, the method for calculating the amount of movement Δ of an image is described. An image intensity distribution I(x) of an image of the sample is represented by Formula (13). For simple explanations, Formula (13) indicates a one-dimensional model. Here, O(x) is an emission distribution of fluorescence that occurs at the sample, and $\tilde{O}(f_x)$ is its Fourier transform. $M(f_x)$ is an MTF of the observation optical system.

$$I(x) = \int_{-\infty}^{\infty} M(f_x)\tilde{O}(f_x)\exp\{-2\pi i f_x(x)\} df_x \quad (13)$$

When image intensity distributions of the first image and second image in which a movement of an image has occurred due to the amount of shift δz from the focal position are $I_{+\Delta}(x)$ and $I_{-\Delta}(x)$, respectively, an image intensity distribution of a difference-operation image is represented by Formula (14) and an image intensity distribution of a sum-operation image is represented by Formula (15).

$$\begin{aligned}
I_{+\Delta}(x) - I_{-\Delta}(x) &= \int_{-\infty}^{\infty} M(f_x)\tilde{O}(f_x)\exp(-2\pi i f_x(x+\Delta)) df_x - \\
&\quad \int_{-\infty}^{\infty} M(f_x)\tilde{O}(f_x)\exp(-2\pi i f_x(x-\Delta)) df_x \\
&= \int_{-\infty}^{\infty} \{\exp(-2\pi i f_x \Delta) - \exp(2\pi i f_x \Delta)\} \\
&\quad M(f_x)\tilde{O}(f_x)\exp(-2\pi i f_x x) df_x \\
&= -2i \int_{-\infty}^{\infty} \sin(2\pi \Delta f_x) M(f_x)\tilde{O}(f_x)\exp(-2\pi i f_x x) df_x
\end{aligned} \quad (14)$$

$$\begin{aligned}
I_{+\Delta}(x) + I_{-\Delta}(x) &= \int_{-\infty}^{\infty} M(f_x)\tilde{O}(f_x)\exp(-2\pi i f_x(x+\Delta)) df_x + \\
&\quad \int_{-\infty}^{\infty} M(f_x)\tilde{O}(f_x)\exp(-2\pi i f_x(x-\Delta)) df_x \\
&= \int_{-\infty}^{\infty} \{\exp(-2\pi i f_x \Delta) + \exp(2\pi i f_x \Delta)\} \\
&\quad M(f_x)\tilde{O}(f_x)\exp(-2\pi i f_x x) df_x \\
&= 2i \int_{-\infty}^{\infty} \cos(2\pi \Delta f_x) M(f_x)\tilde{O}(f_x)\exp(-2\pi i f_x x) df_x
\end{aligned} \quad (15)$$

Then, Formula (16) is derived when the difference-operation image is Fourier transformed, and Formula (17) is derived when the sum-operation image is Fourier transformed. Here, F[ ] is an operator that indicates the Fourier transform.

$$F[I_{+\Delta}(x) - I_{-\Delta}(x)] = -2i \sin(2\pi \Delta f_x) M(f_x)\tilde{O}(f_x) \quad (16)$$

$$F[I_{+\Delta}(x) + I_{-\Delta}(x)] = 2 \cos(2\pi \Delta f_x) M(f_x)\tilde{O}(f_x) \quad (17)$$

Further, when taking the ratio of an imaginary part of Formula (16) and a real part of Formula (17), Formula (18) is derived.

$$\frac{\mathrm{Im}\{F[I_{+\Delta} - I_{-\Delta}(x)]\}}{\mathrm{Re}\{F[I_{+\Delta}(x) + I_{-\Delta}(x)]\}} = \tan(2\pi \Delta f_x) \quad (18)$$

When calculating an arc tangent of Formula (18), Formula (19) is derived.

$$\tan^{-1}\left\{\frac{\mathrm{Im}\{F[I_{+\Delta}(x) - I_{-\Delta}(x)]\}}{\mathrm{Re}\{F[I_{+\Delta}(x) + I_{-\Delta}(x)]\}}\right\} \bigg/ 2\pi = \Delta f_n \quad (19)$$

The amount of movement Δ is calculated on the basis of Formula (19). When the amount of movement Δ of an image is calculated using Formula (19), the amount of movement Δ is preferably calculated in a bandwidth whose spatial frequency $f_x$ is lower, in order to reduce the effect of electrical noise that occurs in the imaging element. Thus, preferably, a linear approximation is performed on values at a plurality of points near zero frequency so as to calculate Δ from its slope.

The above-described processing performed in series using the first image data and the second image data is difference operation processing, which is classified into the correlation measurement method. It is also possible to calculate δz using Formula (12) by calculating the amount of movement Δ using the difference operation processing. Further, the difference operation processing permits a calculation of the amount of movement Δ which is less than one pixel, so three-dimensional information can be obtained at a z resolution shorter than a z resolution that corresponds to a pixel size (that is, with a high resolving power) if the difference operation processing is used.

A distance between images can also be calculated from two pieces of image data by conventionally known phase-only correlation that is a form of the correlation measurement method. However, it is not possible to identify a direction in which an image moves. Thus, when the amount of movement Δ of an image is calculated by the phase-only correlation, it is not possible to determine whether the image is an image of an object point that moves by δz forward from the focal position or an image of the object point that moves by δz rearward from the focal position even if δz is calculated from the amount of movement Δ. Therefore, determination processing is necessary. On the other hand, in the difference operation processing, an image contrast of a difference operation image is inverted according to the direction of δz (that is, forward or rearward from the focal position). This permits an easy identification of three-dimensional information of an object point, in a sample, which corresponds to an image by calculating a signed amount of movement Δ from difference-operation image data so as to calculate signed δz.

According to the above-described method, three-dimensional information of a sample with respect to an area onto which a light sheet is irradiated can be calculated from pieces of image data of the sample. Further, three-dimensional information of the entirety of the sample can be obtained by gradually moving, in a direction of a thickness of the light sheet, a position onto which the light sheet is irradiated to obtain three-dimensional information at each position. It is sufficient if the amount of movement Δz of the light sheet in the thickness direction is not greater than the thickness D of the light sheet, and, for example, it may be set so as to satisfy the following formula. Here, m is any integer value. PP/β/tan ω is an amount of movement in a z direction of an object point when an image of the object point moves laterally by one pixel.

$$\Delta z = (PP/\beta/\tan \omega) \cdot m \quad (20)$$

If a light sheet is moved so that areas, in a sample, onto which the light sheet before and after the movement is irradiated overlap, three-dimensional information of the overlapping areas can be doubly obtained. Thus, even when the three-dimensional information includes an anomalous value, it is possible to easily identify the anomalous value and to remove it. Further, three-dimensional information can also be obtained with a higher accuracy by interpolating the three-dimensional information which has been doubly obtained.

A three-dimensional information obtaining apparatus according to each embodiment will now be specifically described.

First Embodiment

Figure 7:
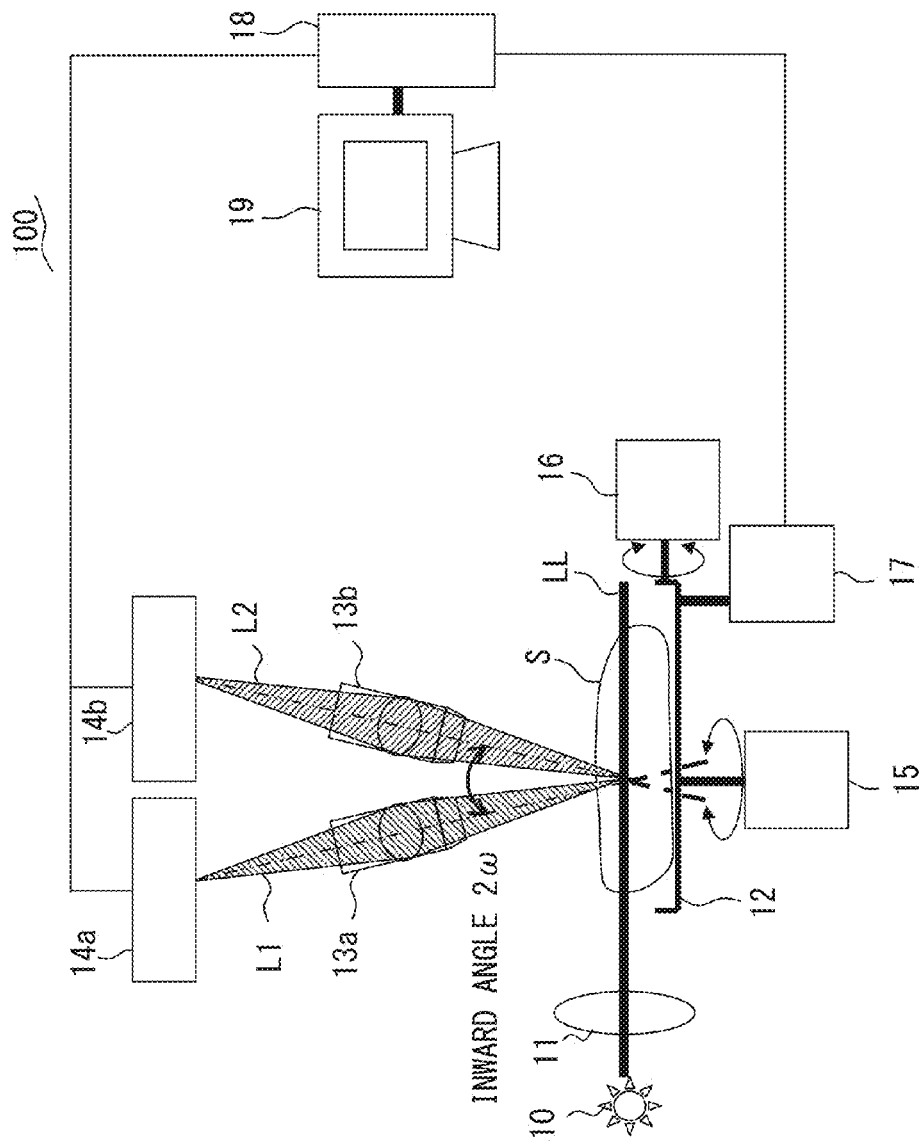
FIG. 7 illustrates a configuration of a three-dimensional information obtaining apparatus 100 according to a first embodiment.
Figure 8:
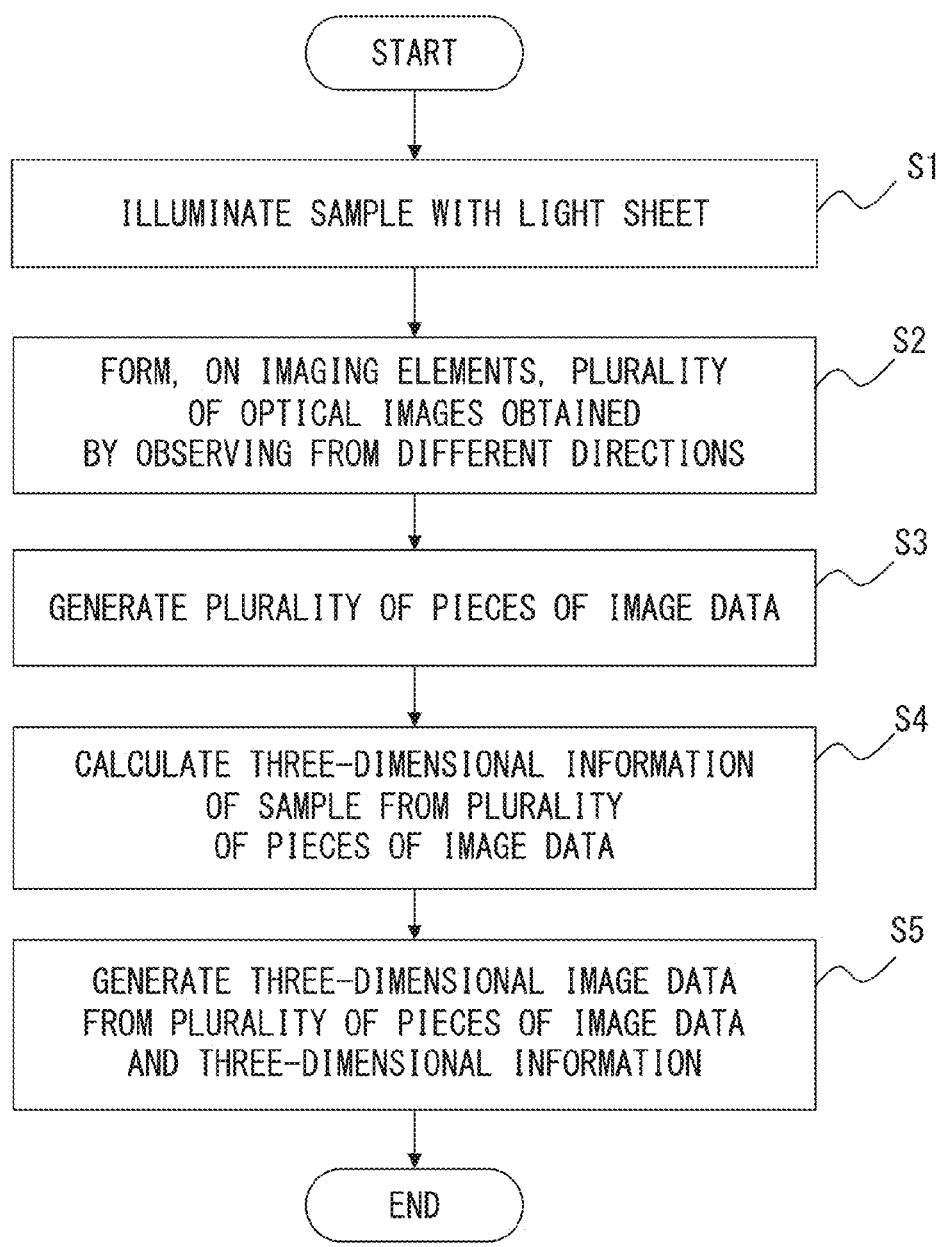
FIG. 8 is a flowchart that illustrates a flow of processing of obtaining three-dimensional information that is performed by the three-dimensional information obtaining apparatus 100 according to the first embodiment.

FIG. 7 illustrates a configuration of a three-dimensional information obtaining apparatus 100 according to the present embodiment. FIG. 8 is a flowchart that illustrates a flow of processing of obtaining three-dimensional information that is performed by the three-dimensional information obtaining apparatus 100. The three-dimensional information obtaining apparatus 100 of FIG. 7 is a light sheet microscopy apparatus, and includes a light source 10, an illumination optical system 11, a sample holder 12, observation optical systems (an observation optical system 13a and an observation optical system 13b), imaging devices (an imaging device 14a and an imaging device 14b), sample rotating mechanisms (a sample rotating mechanism 15 and a sample rotating mechanism 16), a z driving mechanism 17, a computer 18, and a monitor 19.

The light source 10 is, for example, a laser light source. The illumination optical system 11 forms, from illumination light emitted from the light source 10, a light sheet LL that has a predetermined thickness in a direction of a z axis, and illuminates a sample S by the light sheet LL. The illumination optical system 11 may be, for example, an optical system that forms a light sheet using a cylindrical lens. It may be an optical system that includes a scanner and forms a light sheet by directing light by use of the scanner.

The sample S is held in the sample holder 12. The sample holder 12 is rotated about a z-axis by the sample rotating mechanism 15 and is rotated about an x-axis by the sample rotating mechanism 16. The sample rotating mechanism 15 and/or the sample rotating mechanism 16 rotate the sample holder 12 to change the direction of the sample S, which permits a light sheet illumination to enter from a direction in which a shadow is less likely to be created.

Each of the imaging device 14a and the imaging device 14b is an imaging device that has a two-dimensional imaging element and captures an image of the sample S onto which the light sheet LL is illuminated, and is, for example, a CCD camera. A normal line of a light-receiving surface of the two-dimensional imaging element of an imaging device is directed in the z-axis direction.

The observation optical system 13a is an optical system that forms an optical image of the sample S on the two-dimensional imaging element of the imaging device 14a, and the observation optical system 13b is an optical system that forms an optical image of the sample S on the two-dimensional imaging element of the imaging device 14b. In other words, two optical images of the sample S observed from two different directions are formed on the two-dimensional imaging elements of the imaging device 14a and the imaging device 14b. The observation optical system 13a and the observation optical system 13b are each constituted of, for example, an objective and a tube lens. Further, both optical axes of the observation optical system 13a and the observation optical system 13b are inclined by an angle ω with respect to the z-axis direction, and an angle between these optical axes (an inward angle) is 2ω. Preferably, an intersection of these optical axes is substantially consistent with a focal position of the observation optical system 13a and the observation optical system 13b, and is substantially consistent with a position on an optical axis of the illumination optical system 11 in which a light sheet is formed. Further, preferably, the intersection of these optical axes is substantially consistent with a focal position of the illumination optical system 11.

The z driving mechanism 17 is a driving device that moves the sample holder 12 in the z-axis direction, so as to move, in a direction of a thickness of the light sheet LL, an area, in the sample S, onto which the light sheet LL is irradiated. The z driving mechanism 17 is connected to the computer 18, and moves the sample holder 12 in the z-axis direction according to a control signal from the computer 18. The z driving mechanism 17 may be configured to move the light sheet LL instead of the sample S by moving the sample holder 12. In this case, preferably, the z driving mechanism 17 moves the focal position of the observation optical systems according to the movement of the light sheet. Alternatively, another driving mechanism may move the focal position of the observation optical systems. In this case, preferably, the z driving mechanism 17 and the another driving mechanism are controlled such that the movement of the light sheet and the movement of the focal position of the observation optical systems are synchronized with each other.

The computer 18 is an arithmetic device that calculates three-dimensional information of the sample S from a plurality of pieces of image data generated by the imaging devices, and is also a control device that controls operations of the imaging devices and the z driving mechanism 17. The monitor 19 displays, for example, an image of the sample S.

In the three-dimensional information obtaining apparatus 100, first, the illumination optical system 11 illuminates the sample S with a light sheet having a thickness that is not less than the equivalent of a focal depth of the three-dimensional information obtaining apparatus 100 and not greater than the equivalent of twice the focal depth (Step S1). In other words, the sample S is illuminated such that Formula (8) is satisfied on the condition that PP≤λ·β/(4·NA) and such that Formula (9) is satisfied on the condition that P>λ·β/(4·NA).

Then, the observation optical system 13a and the observation optical system 13b observe the sample S illuminated by the light sheet from two different directions, and form two optical images of the observed sample S on their respective two-dimensional imaging elements (Step S2). The imaging device 14a and the imaging device 14b generate two pieces of image data of the sample S and output them to the computer 18 (Step S3).

The computer 18 performs the above-described difference operation processing on the two pieces of image data generated by the imaging devices, and calculates three-dimensional information of an area, in the sample S, onto which the light sheet LL is illuminated (Step S4). Further, in order to scan the sample S in the z-axis direction, the computer 18 controls the z driving mechanism 17 such that the light sheet LL moves in the z-axis direction by a predetermined distance that is not greater than a thickness D of the light sheet LL, so as to move, in the z-axis direction, a position onto which the light sheet LL is irradiated. Accordingly, the area, in the sample S, onto which the light sheet LL is irradiated moves in the z-axis direction. The image devices generate two pieces of image data every time the light sheet LL moves. The computer 18 calculates three-dimensional information every time two pieces of image data are generated, which permits obtaining of three-dimensional information of the entirely of the sample S.

According to the three-dimensional information obtaining apparatus 100, three-dimensional information of an area, in the sample S, onto which a light sheet that is thicker than the focal depth is irradiated can be obtained from pieces of image data that are obtained by irradiating the sample S with the light sheet. Thus, the entirety of the sample S can be scanned a reduced number of times that z-stacking is performed, and, as a result, three-dimensional information of the sample S can be obtained rapidly. Further, an area wider in an xy direction than conventional cases can be illuminated at one time by making the light sheet thicker, which also contributes to obtaining three-dimensional information of the sample S rapidly. Furthermore, an amount of sub-pixel-level movement, that is, an amount of movement less than one pixel can also be detected using the difference operation processing, so three-dimensional information of an area onto which a light sheet is irradiated can be calculated with a high accuracy.

The computer 18 may further generate three-dimensional image data of the sample S from pieces of image data (first image data and second image data) of the sample S and three-dimensional information of the sample S, so as to display it on the monitor 19 (Step S5).

In this case, first, refocus processing is performed, and image data from which the effect of the blurring has been removed is generated from the first image data and the second image data. Specifically, movements of an image that occur in the first image data and the second image data are corrected on the basis of the amount of movement of the image that is calculated when three-dimensional information is obtained, and the first image data and the second image data in which the movements of the image have been corrected are combined. An image of a sample that is displayed on the basis of the image data generated by the refocus processing is a so-called extended focus image. After that, three-dimensional image data is generated from the extended focus image and the three-dimensional information. The three-dimensional image data is image data in which brightness (fluorescence brightness if it is a fluorescence image) of each position is assigned to a three-dimensional position.

FIG. 7 illustrates the three-dimensional information obtaining apparatus 100 having a so-called Greenough configuration in which two optical systems totally independent from each other are included, but the three-dimensional information obtaining apparatus may have a so-called Galilean configuration in which an objective is shared, as illustrated in FIG. 9. A three-dimensional information obtaining apparatus 200 illustrated in FIG. 9 is different from the three-dimensional information obtaining apparatus 100 in that it includes an observation optical system constituted of an objective 20 and a tube lens 21a instead of the observation optical system 13a, and an observation optical system constituted of the objective 20 and a tube lens 21b instead of the observation optical system 13b. Also according to the three-dimensional information obtaining apparatus 200, an advantage similar to that provided by the three-dimensional information obtaining apparatus 100 can be provided.

Second Embodiment

Figure 10:
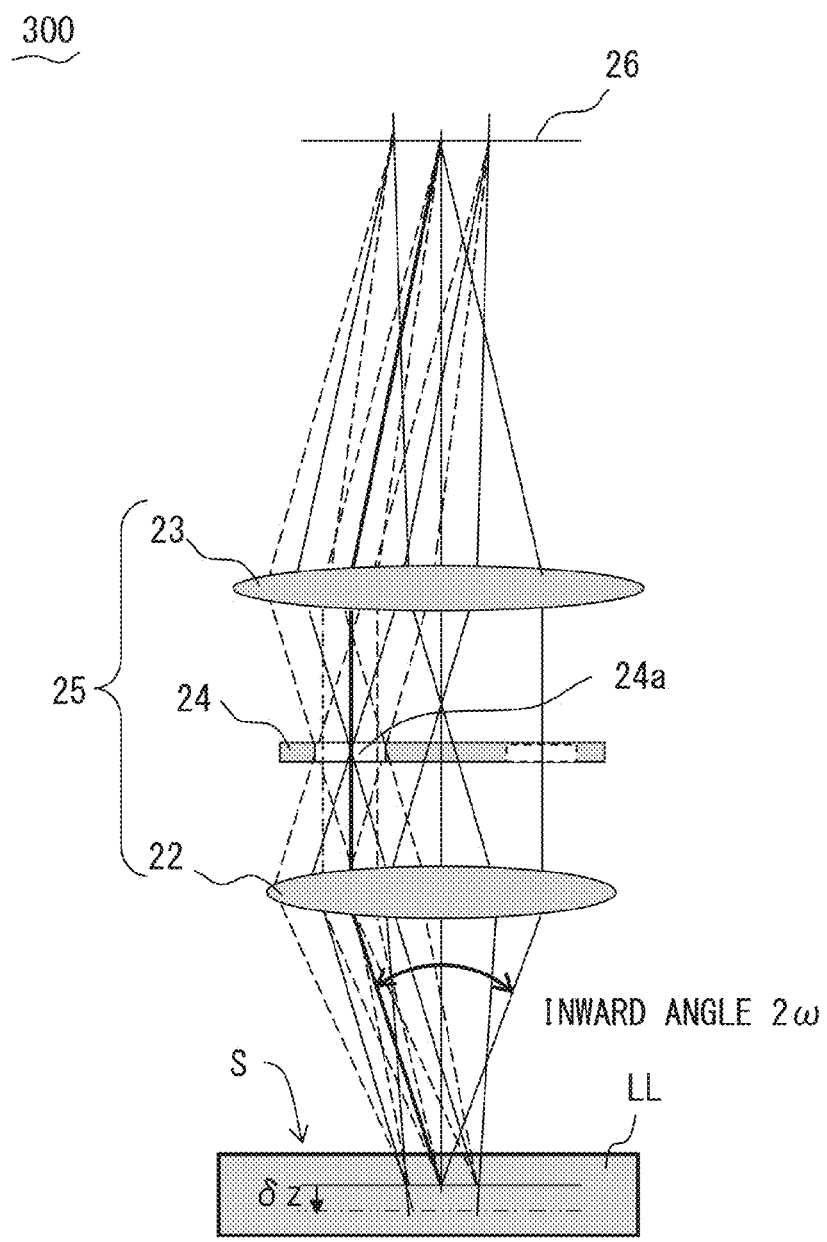
FIG. 10 illustrates a configuration of a three-dimensional information obtaining apparatus 300 according to a second embodiment.
Figure 11:
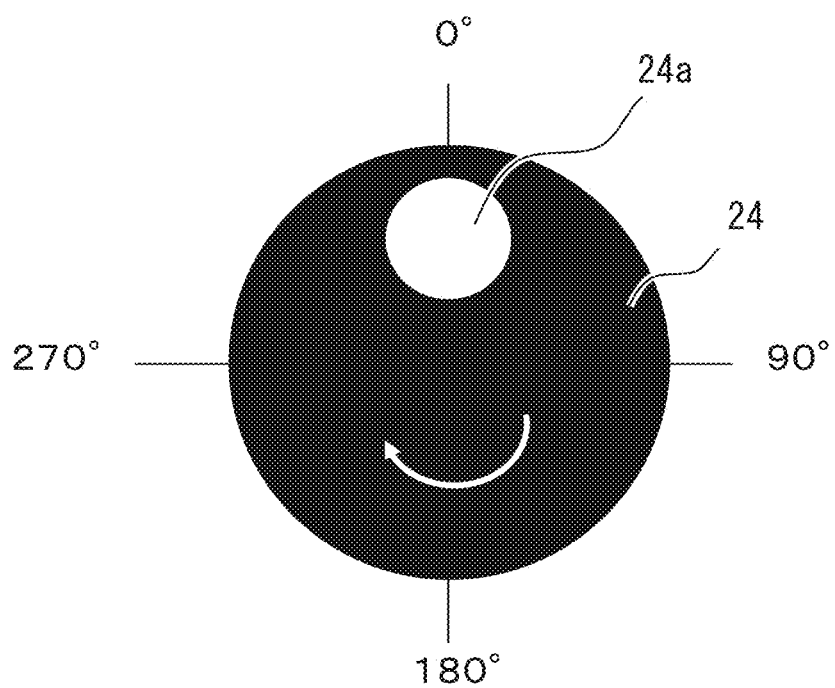
FIG. 11 illustrates a stop 24 included in the three-dimensional information obtaining apparatus 300 as viewed from a direction of an optical axis.
Figure 12:
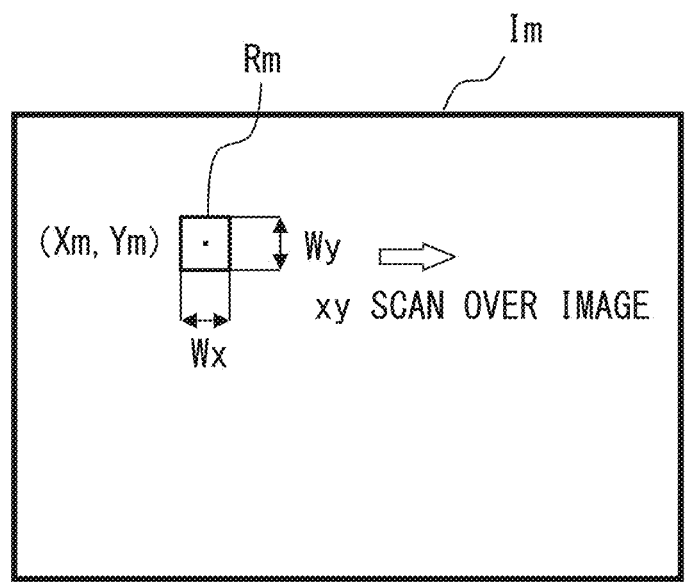
FIG. 12 is a diagram for explaining a setting of a small area.

FIG. 10 illustrates a configuration of a three-dimensional information obtaining apparatus 300 according to the present embodiment. FIG. 11 illustrates a stop 24 included in the three-dimensional information obtaining apparatus 300 as viewed from a direction of an optical axis. FIG. 12 is a diagram for explaining a setting of a small area. Like the three-dimensional information obtaining apparatus 100 according to the first embodiment, the three-dimensional information obtaining apparatus 300 of FIG. 10 is a light sheet microscopy apparatus. However, the three-dimensional information obtaining apparatus 300 is different from the three-dimensional information obtaining apparatus 100 in that it has one observation optical system and one imaging device. The others in the configuration are similar to those of the three-dimensional information obtaining apparatus 100.

An observation optical system 25 includes an objective 22, a tube lens 23, and a stop 24 arranged on a pupil plane of the objective 22. The stop 24 has an aperture 24a arranged in a position eccentric with respect to the optical axis. The stop 24 is configured to be rotatable about the optical axis, and the position of the aperture 24a on the pupil plane varies by having the stop 24 rotated. Accordingly, it is possible to change an area, on the pupil plane, through which a beam that reaches an imaging device 26 is transmitted. As a result, it is possible to form, on a light-receiving surface of the imaging device 26, observed images obtained by observing from different directions.

A method for calculating an amount of movement of an image is specifically described using, as an example, a case in which an image of the sample S is captured when the aperture 24a is located at each of the positions of 0°, 90°, 180°, and 270° by having the stop 24 rotated in increments of 90 degrees, as illustrated in FIG. 11.

First, an image of the sample S is captured when the aperture 24a is located at each of the positions of 0°, 90°, 180°, and 270°, and four pieces of image data are obtained. The obtained pieces of image data are recorded in a recording device of the computer 18.

Next, an amount of movement of the image is calculated from image intensity distributions of the pieces of image data that are obtained at the aperture positions symmetric to each other with respect to the optical axis. Specifically, an image intensity distribution $I_{0-180}$ of difference-operation image data and an image intensity distribution $I_{0+180}$ of sum-operation image data are calculated from an image intensity distribution $I_0$ of image data obtained at the position of 0° and an image intensity distribution $I_{180}$ of image data obtained at the position of 180°. Next, as illustrated in FIG. 12, a small area Rm whose central coordinate is (Xm, Ym) and that has a width Wx in an x direction and a width Wy in a y direction is set to each of the pieces of image data (the difference-operation image data and the sum-operation image data). FIG. 12 illustrates a case in which the small area is set on a difference-operation image Im. Then, an amount of movement Δ is calculated for each of the set areas using Formula (19). The amount of movement calculated here is an amount of movement Δy in the y direction. The reason is that the position of 0° and the position of 180° are different positions in the y direction. After that, the position in which the small area is set is gradually moved so that the entire area is scanned with the small area, which results in calculating the amount of movement Δy in each area. Further, similar processing is performed using an image intensity distribution $I_{90}$ of image data that is obtained at the position of 90° and an image intensity distribution $I_{270}$ of image data that is obtained at the position of 270°, which results in calculating Δx in each area.

After that, Δx and Δy in each small area are compared. When they represent values relatively near each other, that is, for example, when a difference between them is within a predetermined range, their average value or one of the values is selected as an amount of movement Δ in the area. When the difference between them is beyond the predetermined range, one of the values is considered to be an anomalous value, so it is determined which of the values is anomalous, and the value which is not anomalous is selected as an amount of movement Δ in the area. Then, an amount of shift δz from the focal position is calculated for each area using Formula (12), by use of the amount of movement Δ selected for each area.

Also according to the three-dimensional information obtaining apparatus 300, highly accurate three-dimensional information can be obtained rapidly, as is the case with the three-dimensional information obtaining apparatus 100 according to the first embodiment. The following is a specific numerical example. When the three-dimensional information obtaining apparatus 300 is designed such that $\beta=2$, PP=6.5 μm, NA=0.08, and an inward angle tan $\omega$=0.06, the thickness, in the sample S, which is equivalent to the focal depth is 163 μm(=4×6.5/2/0.08). In this case, in the three-dimensional information obtaining apparatus 300, for example, a thickness D of a light sheet can be set to 250 μm, which is equivalent to about 1.5 times the focal depth, and a z resolution can be set to 13 μm(=6.5/2/0.06/4), which is equivalent to ¼ pixels.

Further, like the three-dimensional information obtaining apparatus 100, the three-dimensional information obtaining apparatus 300 also permits generating of three-dimensional image data of the sample S by use of three-dimensional information of the sample S and displaying of a three-dimensional image.

Third Embodiment

FIG. 13 illustrates a configuration of a three-dimensional information obtaining apparatus 400 according to the present embodiment. Like the three-dimensional information obtaining apparatus 300 according to the second embodiment, the three-dimensional information obtaining apparatus 400 of FIG. 13 is a light sheet microscopy apparatus, and is also similar to the three-dimensional information obtaining apparatus 300 in that it has one observation optical system and one imaging device. The three-dimensional information obtaining apparatus 400 is different from the three-dimensional information obtaining apparatus 300 in that it includes an observation optical system 28 instead of the observation optical system 25. The others in the configuration are similar to those of the three-dimensional information obtaining apparatus 300.

The observation optical system 28 is constituted of the objective 22 and a lens array 27, and the lens array 27 includes two lens elements (a lens element 27a and a lens element 27b) that are symmetric to each other with respect to an optical axis of the objective 22. The number of lens elements is not limited to two, and it may be, for example, four. In this configuration, an image is formed for each lens element, so a plurality of images of a sample observed from different directions are formed on the light-receiving surface of the imaging device 26.

According to the three-dimensional information obtaining apparatus 400, an area on the light-receiving surface of the imaging device 26 is divided into the number of lens elements and image data is generated for each area obtained by the division, which permits generating of a plurality of pieces of image data at the same time.

Also according to the three-dimensional information obtaining apparatus 400, highly accurate three-dimensional information can be obtained rapidly, as is the case with the three-dimensional information obtaining apparatus 300 according to the second embodiment. The following is a specific numerical example. When the three-dimensional information obtaining apparatus 400 is designed such that $\beta=1$, PP=3.5 μm, NA=0.06, and an inward angle tan $\omega$=0.06, the thickness, in the sample S, which is equivalent to the focal depth is 233 μm(=4×3.5/1/0.06). In this case, in the three-dimensional information obtaining apparatus 400, for example, a thickness D of a light sheet can be set to 460 μm, which is equivalent to about twice the focal depth, and a z resolution can be set to 15 μm(=3.5/1/0.06/4), which is equivalent to ¼ pixels.

Further, like the three-dimensional information obtaining apparatus 300, the three-dimensional information obtaining apparatus 400 also permits generating of three-dimensional image data of the sample S by use of three-dimensional information of the sample S and displaying of a three-dimensional image.

Fourth Embodiment

Figure 14:
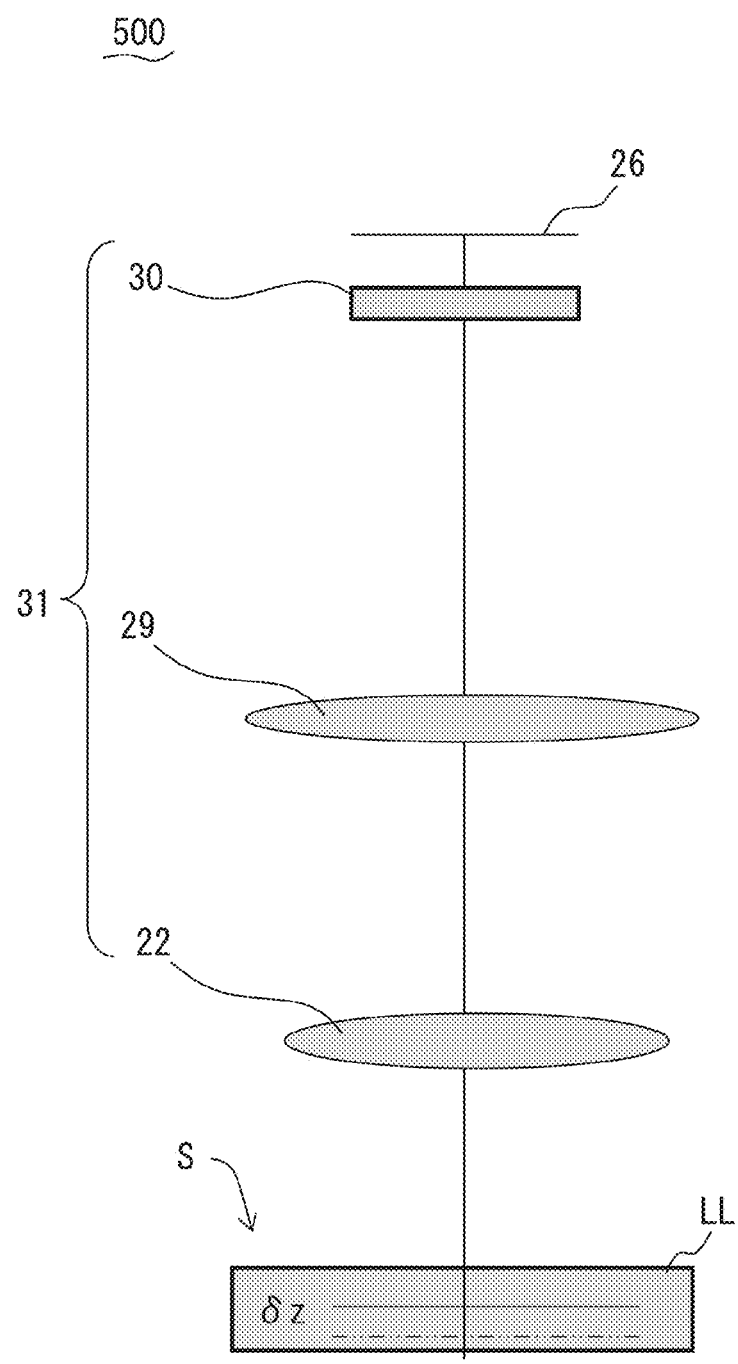
FIG. 14 illustrates a configuration of a three-dimensional information obtaining apparatus 500 according to a fourth embodiment.

FIG. 14 illustrates a configuration of a three-dimensional information obtaining apparatus 500 according to the present embodiment. Like the three-dimensional information obtaining apparatus 300 according to the second embodiment, the three-dimensional information obtaining apparatus 500 of FIG. 14 is a light sheet microscopy apparatus. The three-dimensional information obtaining apparatus 500 is also similar to the three-dimensional information obtaining apparatus 300 in that it has one observation optical system and one imaging device. The three-dimensional information obtaining apparatus 500 is different from the three-dimensional information obtaining apparatus 300 in that it includes an observation optical system 31 instead of the observation optical system 25. The others in the configuration are similar to those of the three-dimensional information obtaining apparatus 300.

The observation optical system 31 includes the objective 22, a tube lens 29, and a microlens array 30. The microlens array 30 is arranged in the vicinity of a rear focal position of the tube lens 29, and the imaging device 26 is arranged such that its light-receiving surface is located in a position of an image formed by the microlens array 30. Imaging by use of such a configuration that uses a microlens array is called light field imaging, and is disclosed in, for example, "Light Field Microscopy" (M. Levoy, R. Ng, A. Adams, M. Footer, and M. Horowitz), in Proceedings of ACM SIGGRAPH (2006), 924-934.

In the observation optical system 31, the microlens array 30 functions so as to project, onto different positions, images of the sample S observed from different directions. Thus, the three-dimensional information obtaining apparatus 500 permits generating of pieces of image data at the same time, the pieces of image data being a plurality of pieces of image data of the sample S and being obtained by observing the sample S from directions different from one another.

Also according to the three-dimensional information obtaining apparatus 500, highly accurate three-dimensional information can be obtained rapidly, as is the case with the three-dimensional information obtaining apparatus 300 according to the second embodiment. The following is a specific numerical example. When the three-dimensional information obtaining apparatus 500 is designed such that β=2, PP=4 μm, NA=0.06, and the periodicity of the microlens array 30 is 8×8 pixels, the thickness, in the sample S, which is equivalent to the focal depth is 133 μm(=4×4/2/0.06). In this case, in the three-dimensional information obtaining apparatus 500, for example, a thickness D of a light sheet can be set to 140 μm, which is equivalent to the focal depth.

Further, like the three-dimensional information obtaining apparatus 300, the three-dimensional information obtaining apparatus 500 also permits generating of three-dimensional image data of the sample S by use of three-dimensional information of the sample S and displaying of a three-dimensional image.

The embodiments described above are just examples to facilitate understanding of the present invention, and the invention is not limited to these embodiments. Various modifications and alterations may be made to a three-dimensional information obtaining apparatus without departing from the invention specified in the claims. A combination of some of the features in the embodiments described herein may be provided as a single embodiment.

What is claimed is:

1. A three-dimensional information obtaining apparatus comprising:
    an illumination optical system configured to illuminate a sample with a light sheet;
    an imaging device configured to have a two-dimensional imaging element and to capture an image of the sample illuminated by the illumination optical system;
    an observation optical system configured to form, on the two-dimensional imaging element, a plurality of optical images of the sample observed from a plurality of different directions; and
    an arithmetic device configured to calculate three-dimensional information of the sample from a plurality of pieces of image data of the sample that are generated by the imaging device, wherein
    a thickness D of the light sheet satisfies the following conditional expression when $PP > \lambda \cdot \beta/(4 \cdot NA)$ is satisfied, where PP is a pixel pitch of the two-dimensional imaging element, λ is a wavelength of observation light from the sample, β is a magnification of the plurality of optical images that are formed by the observation optical system on the two-dimensional imaging element, and NA is a numerical aperture on an object side of the observation optical system:

$D \leq 8 \cdot PP/\beta/NA.$

2. The three-dimensional information obtaining apparatus according to claim 1, wherein
    when $PP \leq \lambda \cdot \beta/(4 \cdot NA)$ is satisfied, the thickness D of the light sheet satisfies the following conditional expression:

$D \leq 2 \cdot \lambda/NA^2.$

3. The three-dimensional information obtaining apparatus according to claim 1, further comprising
    a driving device configured to move, in a direction of the thickness of the light sheet, an area, in the sample, onto which the light sheet is irradiated, wherein
    the imaging device generates the plurality of pieces of image data every time the area, in the sample, onto which the light sheet is irradiated is moved by the driving device by a predetermined distance Δz that is not greater than the thickness D of the light sheet.

4. The three-dimensional information obtaining apparatus according to claim 3, wherein
    when 2ω is an angle between two directions from among the plurality of different directions and m is an integer value, the following conditional expression is satisfied:

$\Delta z = (PP/\beta/\tan \omega) \cdot m.$

5. The three-dimensional information obtaining apparatus according to claim 1, wherein
    the arithmetic device
        calculates, on the basis of the plurality of pieces of image data, an amount of movement of an image by a correlation measurement method, and
        calculates three-dimensional information of the sample on the basis of the calculated amount of movement of the image.

6. The three-dimensional information obtaining apparatus according to claim 5, wherein
    the arithmetic device
        calculates, on the basis of the plurality of pieces of image data, an amount of movement of an image using difference operation processing, and
        calculates three-dimensional information of the sample on the basis of the calculated amount of movement of the image.

7. The three-dimensional information obtaining apparatus according to claim 1, wherein
    the observation optical system includes a plurality of observation optical systems configured to observe the sample from directions different from one another, and
    the imaging device includes a plurality of imaging devices that capture images of the sample observed from directions different from one another.

8. The three-dimensional information obtaining apparatus according to claim 1, wherein
    the observation optical system includes
        an objective,
        a tube lens configured to collect light from the objective on the two-dimensional imaging element, and
        a light shielding unit that is configured to limit an area, on a pupil plane of the objective, through which light is transmitted and that includes a mechanism configured to change the position of the area.

9. The three-dimensional information obtaining apparatus according to claim 1, wherein
    the observation optical system includes
        an objective, and
        a lens array that is constituted of a plurality of lens elements which pieces of light transmitted through a plurality of areas different from one another on the pupil plane of the objective enter and that is configured to collect light from the objective on the two-dimensional imaging element.

10. The three-dimensional information obtaining apparatus according to claim 1, wherein
    the observation optical system includes
        an objective,
        a tube lens configured to collect light from the objective, and
        a microlens array arranged between the tube lens and the imaging device.

11. The three-dimensional information obtaining apparatus according to claim 1, wherein
    the arithmetic device generates three-dimensional image data of the sample on the basis of the calculated three-dimensional information of the sample and the plurality of pieces of image data.

12. A method for obtaining three-dimensional information, the method comprising:

provided, illuminating a sample with a light sheet;

forming, on a two-dimensional imaging element, a plurality of optical images of the sample illuminated by the light sheet, the plurality of optical images being optical images obtained by observing the sample from directions different from one another;

generating a plurality of pieces of image data of the sample using the imaging device that includes the two-dimensional imaging element on which the plurality of optical images are formed; and calculating three-dimensional information of the sample from the plurality of pieces of image data, wherein a thickness D of the light sheet satisfies the following conditional expression when $PP > \lambda \cdot \beta/(4 \cdot NA)$ is satisfied, where PP is a pixel pitch of the two-dimensional imaging element, $\lambda$ is a wavelength of observation light from the sample, $\beta$ is a magnification of the plurality of optical images that are formed on the two-dimensional imaging element, and NA is a numerical aperture on an object side of the observation optical system:

$D \leq 8 \cdot PP/\beta/NA$.

* * * * *